Nov. 29, 1927.
V. J. TICHOTA
1,650,883
DRAFT EQUALIZER
Filed Oct. 12, 1926
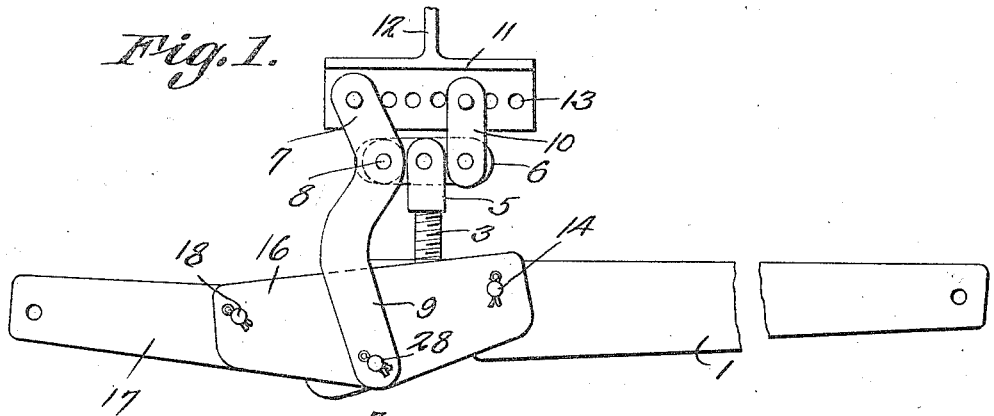
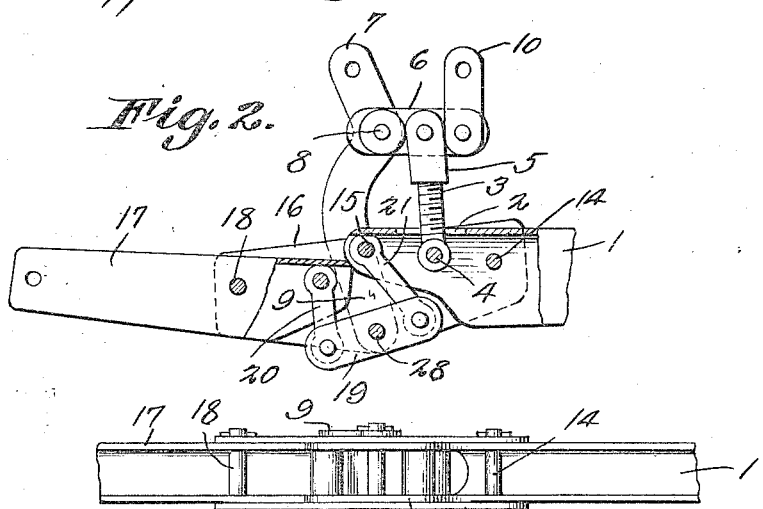
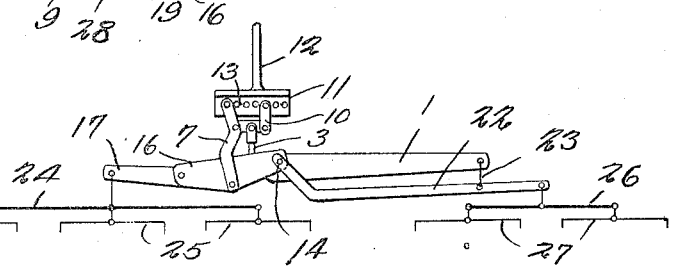
Vencel J. Tichota
Inventor
By C. A. Snow & Co.
Attorneys.

Patented Nov. 29, 1927.

1,650,883

UNITED STATES PATENT OFFICE.

VENCEL J. TICHOTA, OF DODGE, NEBRASKA.

DRAFT EQUALIZER.

Application filed October 12, 1926. Serial No. 141,099.

This invention relates to a draft equalizer designed primarily for use with four or five draft animals, one of the objects being to provide a novel arrangement of levers and links for coupling the whiffle-trees to the clevis of the structure being drawn whereby the load will be distributed evenly to the several animals.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a plan view of the equalizer.

Figure 2 is a view partly in plan and partly in section of the central portion of the equalizer.

Figure 3 is a front elevation of the structure shown in Figure 2.

Figure 4 is a plan view more or less in diagram showing the equalizer for use with five horses.

Referring to the figures by characters of reference 1 designates an elongated beam preferably formed of metal and channeled longitudinally, this beam being provided near its inner end, with a slot 2 through which extends a bolt 3. The bolt is pivotally connected at 4 to the beam and the back end portion of the bolt is adjustably mounted in a yoke 5 straddling and pivotally connected to a cross bar 6. A bell crank 7 is pivotally connected at 8 to one end portion of the bar 6 and has an arm 9 extending forwardly at an obtuse angle to one of the arms of the bell crank. A link 10 is connected to the other end of the bar 6 and this link, as well as the adjacent arm of the bell crank 7, is adapted to be connected to the apertured head 11 of a clevis 12. By providing a longitudinal series of apertures 13 in the head 11 the equalizer can be adjusted bodily toward the left or right relative to the clevis.

The pivot 4 in the beam 1 is located midway between pivot pins 14 and 15. Mounted on the pivot pin 14 are superposed connecting plates 16 between which the beam 1 is extended. Extending between these plates 16 at the other end is a short beam 17 preferably of metal and channeled longitudinally, this short beam being connected to the plates 16 by a pivot pin 18.

It is to be understood of course that two bell cranks 7 with their arms 9 are provided and two links 10 are also provided, the bar 6 being extended between the two links and also between the two bell cranks. The arms 9 of the two bell cranks extend over and under plates 16 respectively and pivotally mounted between the forward ends of these arms 9 is a lever 19 one end of which is connected by a link 20 to the inner end portion of the beam 17 while the other end portion of lever 19 is connected by a link 21 to the inner end portion of the beam 1 at the pivot 15.

Any suitable arrangement of whiffle-trees and single trees can be provided in connection with the beams 1 and 17 where four horses are to be used. Where a team of five horses is to be employed, an arrangement such as illustrated in Figure 4 is preferably used. With this modified arrangement an attachment in the form of a supplemental means 22 is provided, the same having one end portion offset at an angle and pivotally connected to the pin 14. A link 23 connects the outer end of beam 1 to the beam 22 at a point near the free end of said beam 22. A whiffle-tree 24 is connected to the outer end of beam 17 and carries single trees 25 while another whiffle-tree 26 is connected to the free end portion of beam 22 and has two single trees 27.

In both forms of the equalizer the relative proportions of the beams are such that power applied through one group of single trees will not do more than ordinarily counterbalance power applied to the remaining single trees. When the outer end of the short beam 17 is pulled forwardly motion will be transmitted therefrom through link 20 to lever 19 and through link 21 to the inner end of the beam 1. When the long arm of beam 1 is thus thrust or swung backwardly motion will be transmitted therefrom through the pivots 14 and the plates 16 to the long arm of the beam 17 with the result that said arm will tend to swing backwardly about its connection with the link 20, the plates 16 at the same time swinging about the pivot pin 28 which extends through them and through lever 19 and arms 9. The arrangement of bolt 3, bell crank 7, link 10 and cross bar 6 is such as to allow the parts to swing laterally relative to the clevis.

What is claimed is:

1. A draft equalizer including oppositely extending beams of different lengths, connecting plates pivotally attached to the beams, a bell crank for attachment to a clevis having a forwardly extended arm, a lever between the connecting plates, a pivotal connection between the plates, arm and lever, link connections between the ends of the lever and the inner ends of the respective beams, a bar pivotally connected to the bell crank, means pivotally connected to the inner end portion of the long beam and to an intermediate portion of the bar for holding said beam and bar together, and a link for connecting one end portion of the bar to a clevis.

2. A draft equalizer including oppositely extending beams of different lengths, connecting members extending across the inner ends of and pivotally attached to the beams, a bell crank for connection with a clevis, said bell crank having a forwardly extending arm, a lever between the beams, a pivotal connection between the arm, connecting members and lever, link connections between said lever and the inner end portions of the respective beams, a bar pivotally connected to the bell crank, means for connecting one end portion of said bar to a clevis, and an adjustable pivotal connection between the intermediate portion of said bar and the inner end portion of the long beam.

In testimony that I claim the foregoing as my own, I have hereto affixed my signature.

VENCEL J. TICHOTA.